(12) United States Patent
Voldman

(10) Patent No.: US 6,574,078 B1
(45) Date of Patent: Jun. 3, 2003

(54) METHOD AND APPARATUS FOR PROVIDING ELECTROSTATIC DISCHARGE PROTECTION OF A MAGNETIC HEAD USING A MECHANICAL SWITCH AND AN ELECTROSTATIC DISCHARGE DEVICE NETWORK

(75) Inventor: Steven H. Voldman, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/602,809

(22) Filed: Jun. 23, 2000

(51) Int. Cl.[7] ............................. G11B 5/39; G11B 5/40
(52) U.S. Cl. ................. 360/323; 360/245.8; 360/128
(58) Field of Search .......................... 360/128, 323, 360/245.8

(56) References Cited

U.S. PATENT DOCUMENTS

| | | | |
|---|---|---|---|
| 5,680,274 A | 10/1997 | Palmer | 360/245.9 |
| 5,710,682 A | 1/1998 | Arya et al. | 360/245.8 |
| 6,163,437 A * | 12/2000 | Inage et al. | 360/128 |
| 6,233,127 B1 * | 5/2001 | Shimazawa | 360/319 |
| 6,259,573 B1 * | 7/2001 | Tsuwako et al. | 360/244.1 |
| 6,275,361 B1 * | 8/2001 | Wallash et al. | 360/323 |

* cited by examiner

Primary Examiner—Jefferson Evans
(74) Attorney, Agent, or Firm—Altera Law Group, LLC

(57) ABSTRACT

A magnetic head using a mechanical switch and an electrostatic discharge device network is disclosed. A mechanical switch is in series and parallel configuration with a silicon electrostatic discharge network. The electrostatic discharge network can be controlled in an on or off state for testing, evaluation or diagnostics of the armature or MR head.

18 Claims, 6 Drawing Sheets

METHOD AND APPARATUS FOR PROVIDING ELECTROSTATIC DISCHARGE PROTECTION OF A MAGNETIC HEAD USING A MECHANICAL SWITCH AND AN ELECTROSTATIC DISCHARGE DEVICE NETWORK

BACKGROUND OF THE INVENTION

1. Field of the Invention

This invention relates in general to a protection of magnetoresistive heads, and more particularly to a method and apparatus for providing electrostatic discharge protection of a magnetic head using a mechanical switch and an electrostatic discharge device network.

2. Description of Related Art

Most disc drives built today use conventional thin-film recording heads. Magnetic heads typically consist of a titanium carbide ceramic or silicon slider body and a transducer. Today, most disk drives employ MR heads. MR heads provide improved performance in a number of important respects.

MR heads operate on according to a phenomenon known as the magneto-resistive effect. Certain metals, when exposed to a magnetic field, change their resistance to the flow of electricity. This property is exploited in creating the read element of an MR head. Reading information for the media is accomplished by constantly passing a sense current through the read element of the head. When the head passes over a magnetic field on the media, the head changes its resistance, which is detected by the change in amperage of the sense current.

A major problem that is found during the manufacture of magnetic recording heads, particularly of the thin film type, is the spurious discharge of static electricity which has been undesirably generated. Static charges may be produced by the presence of certain materials, such as plastics, which are present in the surroundings at the place of manufacture of the magnetic heads. Further, static charges may be present during human handling and tooling of the magnetic recording heads. Compared to previous generation thin-film heads, MR heads are typically 200 times more sensitive to damage caused by electrostatic discharge (ESD)

When there is a static discharge, between a magnetic pole piece and an adjacent conductive layer, the pole piece may be damaged, particularly at a critical sensing portion, such as at the tip of the pole piece which is exposed and disposed adjacent to the transducing gap facing the record medium. In addition, the dielectric or insulating material that surrounds the magnetic head coil could break down from the discharge effect. As a result, the head assembly is subject to deterioration and degradation so that it is rendered virtually useless.

Approaches to alleviate this problem have involved the grounding of operators, table tops, or the use of ion producing fans and air hose nozzle application. Also, the materials used for storage containers and work trays must be carefully selected. However, the basic problem of spurious discharge at the critical pole tip area has not been completely solved by these approaches.

In addition, many approaches have been used for protecting magnetic heads from ESD destruction. For example, U.S. Pat. No. 5,710,682, issued Jan. 20, 1998, to Arya et al., entitled "ELECTROSTATIC DISCHARGE PROTECTION SYSTEM FOR MR HEADS", and incorporated herein by reference, discloses a shorting bar, which comprises an electrically conductive member attached to the actuator arm, for automatically connecting the MR wire leads at an exposed contact region of the MR head wire leads when absence of support of the MR head permits the load beam to bend sufficiently toward the shorting bar. However, the shorting of the leads by the shorting bar prevents testing and other diagnosis of the MR head.

It can be seen that there is a need for a method and apparatus for providing electrostatic discharge protection of a magnetic head without preventing electrostatic discharge testing or other diagnosis of the magnetic head.

It can also be seen that there is a need for a method and apparatus for providing electrostatic discharge protection of a magnetic head using a mechanical switch and an electrostatic discharge device network.

SUMMARY OF THE INVENTION

To overcome the limitations in the prior art described above, and to overcome other limitations that will become apparent upon reading and understanding the present specification, the present invention discloses a method and apparatus for providing electrostatic discharge protection of a magnetic head using a mechanical switch and an electrostatic discharge device network.

The present invention solves the above-described problems by providing a mechanical switch that is in series and parallel configuration with a silicon electrostatic discharge network. The electrostatic discharge network can be controlled in an on or off state for testing, evaluation or diagnostics of the armature or MR head.

A method in accordance with the principles of the present invention includes engaging an electrostatic discharge element between leads from a head element in response to absence of support to the head.

Other embodiments of a method in accordance with the principles of the invention may include alternative or optional additional aspects. One such aspect of the present invention is that the method further includes disengaging the electrostatic discharge element in response to support being applied to the head.

Another aspect of the present invention is that the electrostatic discharge element is turned on to maintain electrostatic discharge protection for the head.

Another aspect of the present invention is that the electrostatic discharge element is turned off to allow operation of the head.

Another aspect of the present invention is that the operation of the head includes testing, evaluation and diagnostics of the head.

Another aspect of the present invention is that the electrostatic discharge element is coupled to a first lead from a head element via a first input/output line, the engaging further including shorting a second lead from the head element to a second input/output line of the electrostatic discharge element.

Another aspect of the present invention is that the shorting connects the electrostatic discharge element being to the first and second leads from the head element in parallel with the head element.

Another aspect of the present invention is that the electrostatic discharge element includes a pair of back-to-back, parallel diodes for accommodating both positive and negative potentials across the element.

Another aspect of the present invention is that the electrostatic discharge element includes an N-type MOSFET transistor disposed between the first and second lead of the head element, a gate of the MOSFET transistor being tied to the first lead of the head element.

Another aspect of the present invention is that the head element includes an MR element.

Another aspect of the present invention is that the head element includes an inductive coil element.

Another embodiment of the present invention includes an apparatus for protecting an MR head from electrostatic discharge, wherein the apparatus includes a first lead from a head element, a second lead from a head element having a contact point, an electrostatic discharge element, coupled to the first lead from the head element via a first input/output line, the electrostatic discharge element having a second input/output line with a contact point and a conductive member positioned proximate the contact point of the second lead and the contact point of the second input/output line, the conductive member engaging the contact point of the second lead and the contact point of the second input/output line in response to absence of support to the head, the engagement of the conductive member with the contact point of the second lead and the contact point of the second input/output line connecting the electrostatic discharge element to the first and second leads from the head element in parallel with the head element.

Another embodiment of the present invention includes a disk drive system, wherein the disk drive includes a magnetic storage disk for storing data thereon, a MR head located proximate to the disk for reading and writing data to and from the disk, a disk movement device, coupled to the disk, for rotating the disk, an actuator arm, coupled to the MR head, for supporting the MR head and an actuator, coupled to the access arm, for moving actuator arm to position the MR head relative to the disk; wherein the actuator arm further includes a first lead from a head element, a second lead from a head element having a contact point, an electrostatic discharge element, coupled to the first lead from the head element via a first input/output line, the electrostatic discharge element having a second input/output line with a contact point, and a conductive member positioned proximate the contact point of the second lead and the contact point of the second input/output line, the conductive member engaging the contact point of the second lead and the contact point of the second input/output line in response to absence of support to the head, the engagement of the conductive member with the contact point of the second lead and the contact point of the second input/output line connecting the electrostatic discharge element to the first and second leads from the head element in parallel with the head element.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a magnetic head using a mechanical switch and an electrostatic discharge device network. The present invention provides a mechanical switch that is in series and parallel configuration with a silicon electrostatic discharge network. The electrostatic discharge network can be controlled in an on or off state for testing, evaluation or diagnostics of the armature or MR head.

Figure 1:
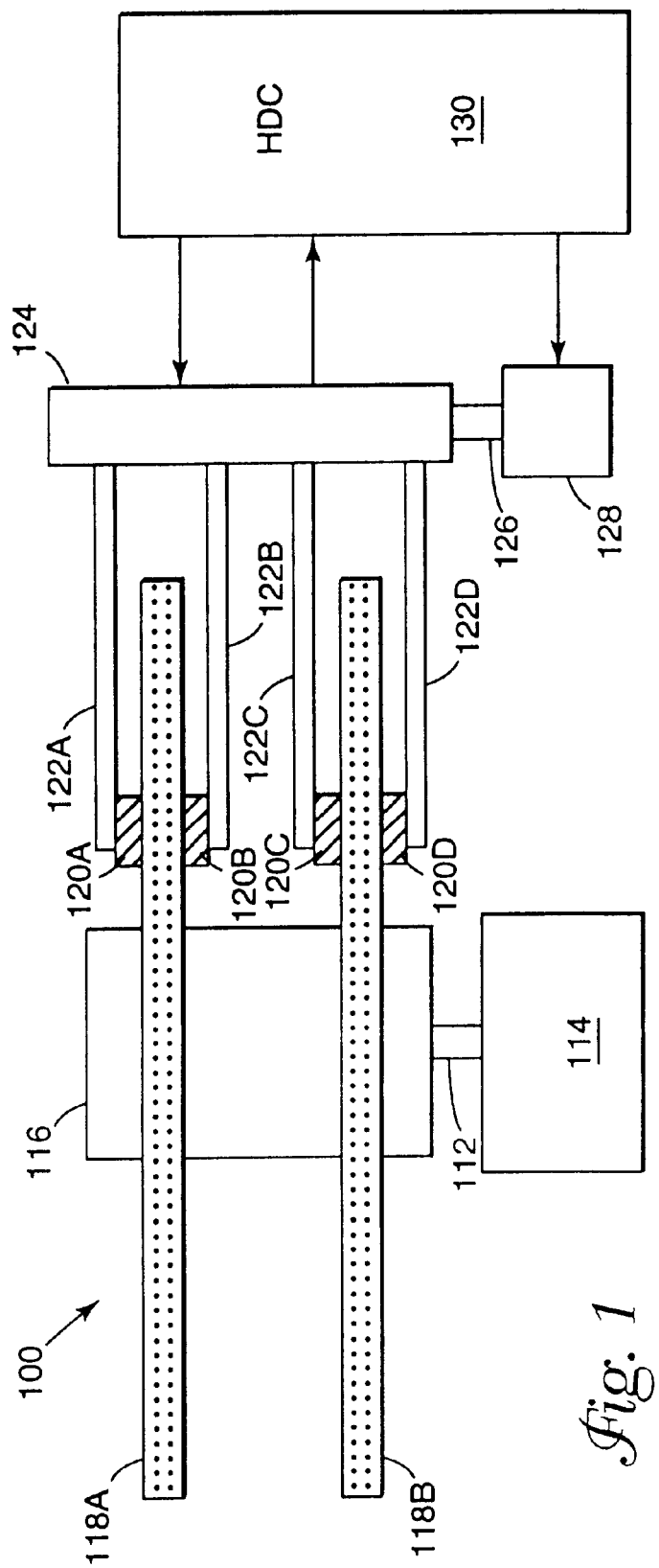
FIG. 1 illustrates a hard disk drive (HDD) according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2A:
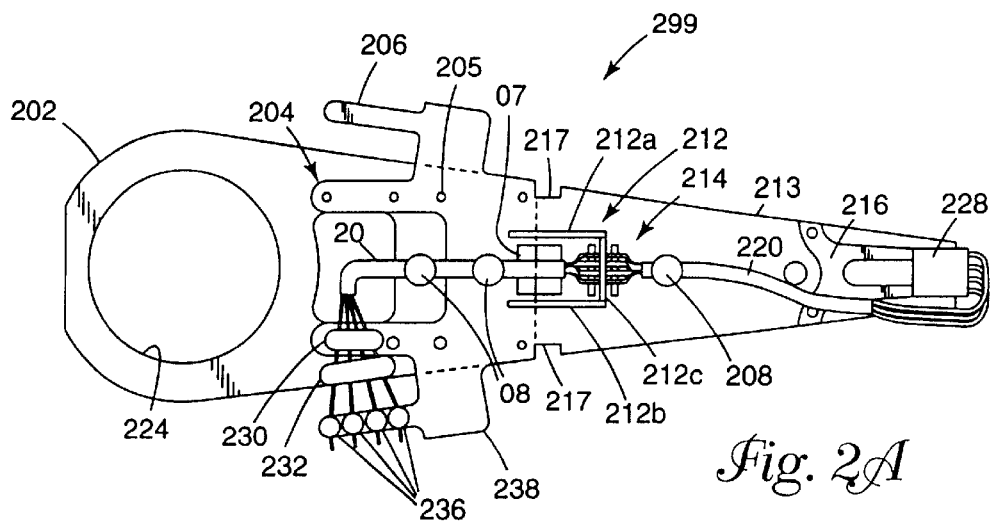
FIG. 2a depicts the hardware components and interconnections of a prior ESD protection system.

FIG. 2a depicts the hardware components and interconnections of a prior ESD protection system. FIG. 2a depicts an integrated suspension assembly 299, which is one of many components in a magnetic data storage drive. The assembly 299 defines a hole 224 that closely fits around an actuator bearing cartridge or another appropriate HDA component to mount the assembly 299 within the data storage drive.

The primary components of the assembly 299 include an MR head 228, a load beam 213, a flexure 216, and an actuator arm 202. The MR head 228 Is mounted to the flexure 216. The flexure 216 extends largely coincident with the load beam 213. The load beam 213 includes an extension 204 for connecting it to the arm 202. The load beam 213 includes a flexible hinge 217, which permits the distal tip of the load beam 213 to freely move in two directions as the load beam 213 bends about the hinge 207 with respect to the arm 202. The flexible hinge 217 preferably comprises a region of the load beam 213 that has been selectively narrowed to provide the load beam 213 with a desired level of flexibility relative to the arm 202. To further reduce the rigidity of the hinge 217, the load beam 213 may define an open area 207.

Hinge 217 permits the distal tip of the load beam 213 to move "downward" and back "upward" again. Thus, as described in great detail below, during operation of the suspension assembly 299 the hinge 217 permits the MR head 228 to closely track the surface of a magnetic recording disk above a thin air bearing, despite any ridges, valleys, or other imperfections in the disk surface.

In addition to the hinged load beam 213, the flexure 216 also helps the MR head 228 to closely track surfaces of magnetic recording disks. In particular, the flexure 216 preferably comprises a very thin layer of metal that generally extends coincident to the load beam 213. Since the flexure 216 is only attached to the load beam 213 at its base, the distal tip of the flexure 216 can fluctuate with respect to the distal tip of the load beam 213. Hence, the flexure 216 helps the MR head 228 to closely track the recording disk, despite variations in the disk surface that might exceed the ability of the hinge 217 to allow sufficient movement of the load beam 213 in the downward and upward directions.

The assembly 290 further includes multiple MR lead wires 220 that electrically connect the MR head 228 to various circuits that assist the MR head 228 in reading and writing data from/to magnetic recording media. These circuits may include, far example, channel electronics, locate apart from the assembly 299. The MR lead wires 220 preferably comprise wires, the assembly of which is referred to as a "wire harness" or "wire assembly". The MR lead wires 220 may be held together by a tubular sheath (as illustrated), configured in a wire "bundle", or arranged in another suitable manner.

The MR lead wires 220 are connected to various components of the MR head 228. The wires 220 run from the MR head 228, along the flexure 216 and load beam 213, across a portion of the arm 202, and thereafter to off-assembly components via another interconnect such as a ribbon cable (not shown). The wires 220 may be affixed to the load beam 213 and the arm 202 by a series of anchors 208. The wires 220 ultimately extend to a terminal connecting sidetab 238, where adhesive dots 236 anchor the wires 220 to the side tab 238 with predetermined spacing between the wires.

A contact region 214 is provided so that electrical contact with the wires 220 is possible. A conductive member or shorting bar 212 is provided to electrically short the wires 220 of the contact region 214 at certain times. At these times the shorting bar 212 engages the MR lead wires 220 of the contact region 214 to electrically short the wires 220 together. This prevents any transient voltages from developing across components of the MR head 228 that arc attached to the MR lead wires exposed at the contact region 214. The shorting bar 212 comprises an electrical conductive material, such as stainless steel, copper or brass. The shorting bar 212 is mounted to a portion of the assembly 299 that does not move with fluctuation of the flexure 216 and load beam 213. For example, the bar 212 may be mounted to the extension 204 or to the arm 202. As shown most clearly in FIG. 2a, the bar 212 may comprise a "U" shape, with legs 212a–212b that are affixed to the extension 204 and interconnected by a contact member 212c. The contact member 212c and the contact region 214 meet and electrically connect when the load beam 213 bends sufficiently toward the contact member 212c about the hinge 217. i.e. when the MR head 228 moves a sufficient distance in the downward direction.

Figure 2B:
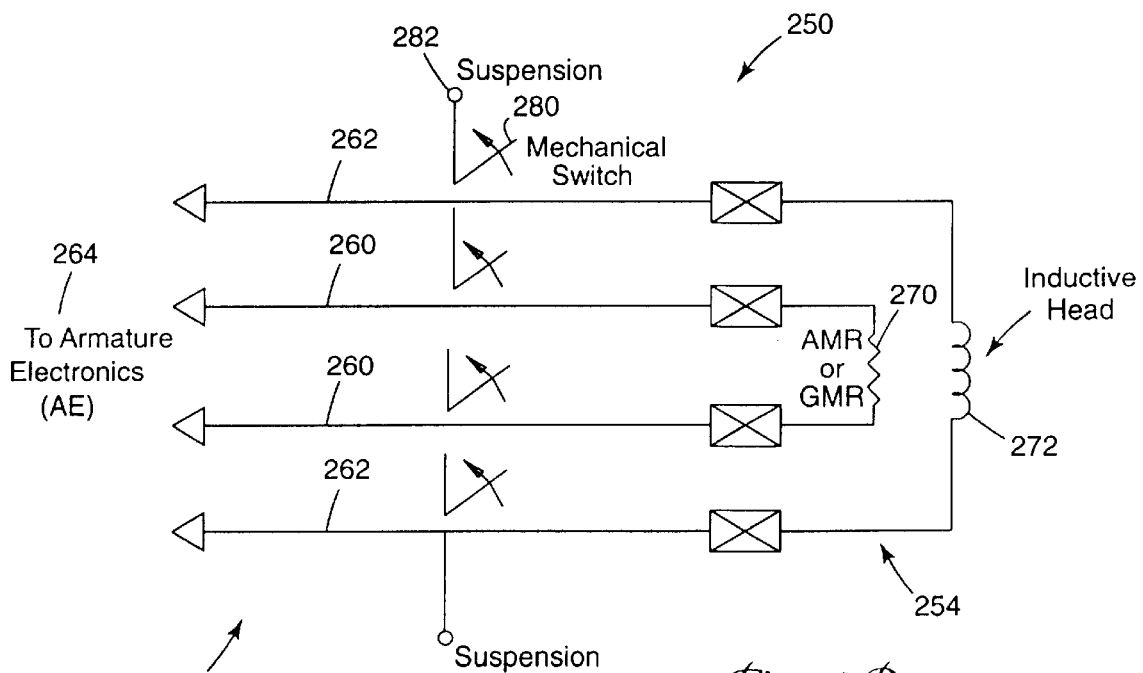
FIG. 2b is an electrical schematic of the ESD protection system described with reference to FIG. 2a above.

FIG. 2b is an electrical schematic 250 of the ESD protection system described with reference to FIG. 2a above. In FIG. 2b, a four lead 252 MR/inductive head 254 is shown. Two leads 260 extend to the armature electronics (AE) 264 from the MR head 270. Note that the MR head 270 may be an anisotropic MR head or a giant MR head. In addition, two leads 262 extend from the inductive head 272 to the armature electronics. The shorting bar described with reference to FIG. 2a is shown in FIG. 2b as a series of switches 280. The switches 280 are closed to short the four leads 252 to the suspension 282. This is effectively the result of the shorting bar engaging the leads 252 from the head 254.

Figure 3:
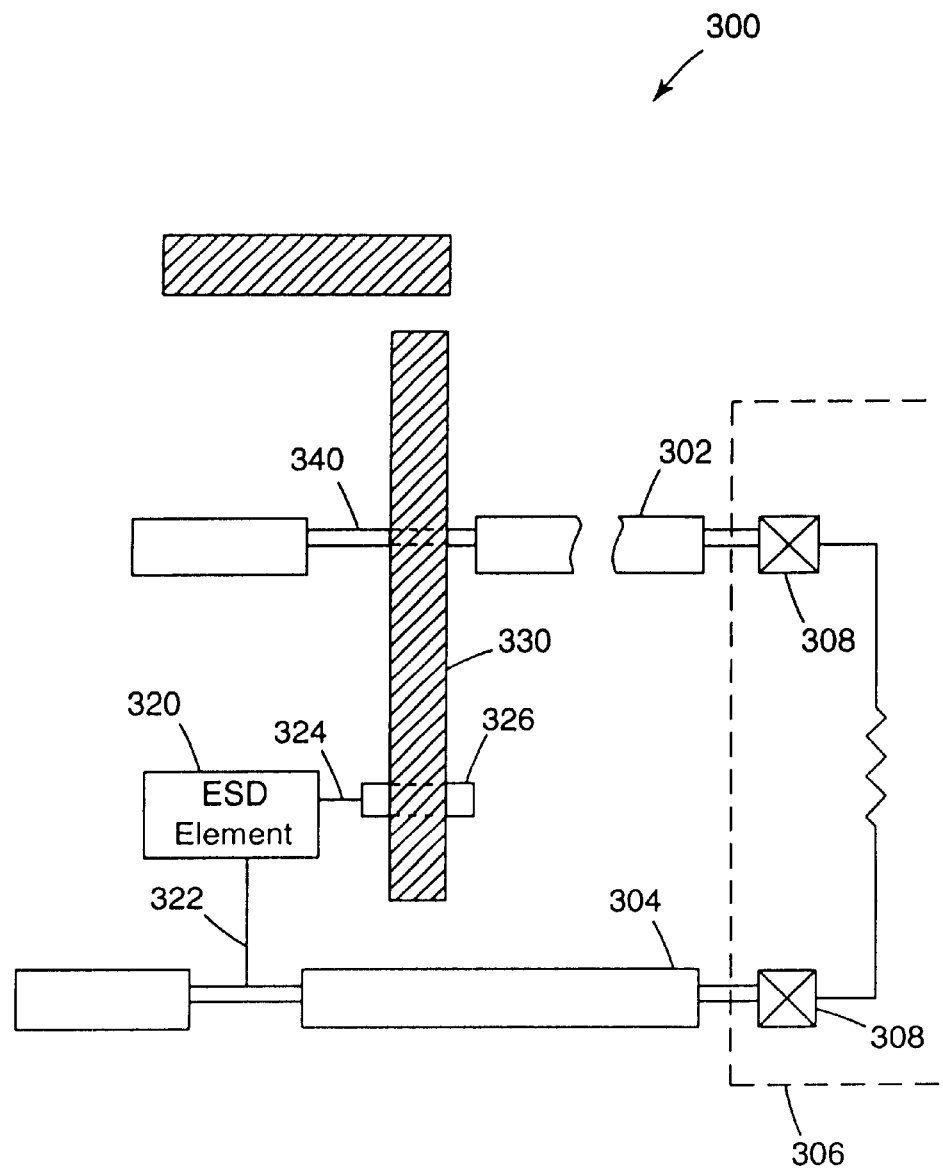
FIG. 3 illustrates the apparatus for providing electrostatic discharge protection of a magnetic head.

FIG. 3 illustrates the apparatus 300 for providing electrostatic discharge protection of a magnetic head according to the present invention. In FIG. 3, the leads 302, 304 from a MR head 306 to the armature electronics (not shown) are illustrated as being attached to the pads 308 of the MR head 306. The leads 302, 304 may include an insulation covering the actual conductive material. An electrostatic discharge device 320 includes a first input/output line 322 that is coupled to a first lead 304. The electrostatic discharge element 320 includes a second input/output line 324 that provides a shorting connection or contact point 326. A mechanical switch, in the form of a conductive member 330, aligns with contact points 326 of the electrostatic discharge element 320 and the contact points 340 of a second lead 302 from the MR head 306. The mechanical switch 330 is engaged during the absence of support to the MR head 306 and disengaged during the presence of support to the MR head 306. Thus, the MR head 306 (GMR or AMR) receives ESD protection from a mechanical mechanism 330 which is in a series and parallel configuration with a silicon ESD device network 320. The mechanical device 330 consists of a paddle board or suspension assembly that acts as a mechanical switch, which is closed when the head is not in operation, i.e. supported.

The ESD network 320 is in series with the mechanical switch. 330 to direct the current away from the MR head. In a series configuration, the ESD network 320 can be in series with the mechanical switch 330. The ESD network 320 can be controlled in an "on" or "off" state for testing, evaluation or diagnostics of the armature or MR head 308. Furthermore, in a series configuration, the mechanical switch 330 can unload the ESD network 320 to avoid capacitance and functional loading on the MR head 306 so that GMR and AMR functional performance is not degraded. The mechanical device 330 is electrically isolated.

Accordingly, the mechanical switch 330 provides ESD protection to the MR head 306 while avoiding unwanted performance impact of the ESD network 320 on head performance. The present invention allows for ESD testing without direct shorting across the MR head 306, whereas the prior systems shorts the leads, which prevents testing and other means of diagnosis.

Figure 4:
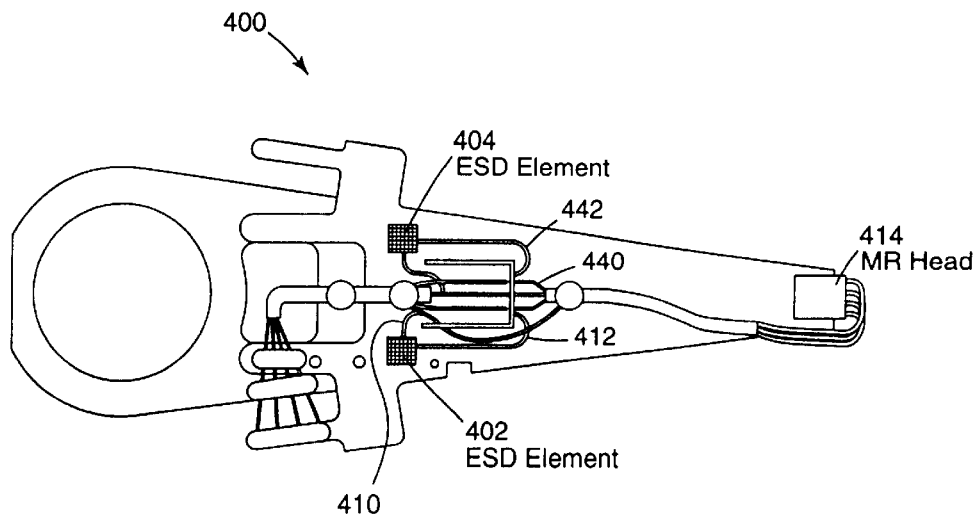
FIG. 4 illustrates the hardware components and interconnections of the ESD protection system according to the present invention.

FIG. 4 illustrates the hardware components and interconnections of the ESD protection system 400 according to the present invention. In FIG. 4, the ESD elements 402, 404 are shown with a first input/output line 410 connected to a first wire 412 from the MR head 414. The mechanical shorting bar, or conductive member 430, is shown shorting together the second wires 440 from the MR head 414 to the second input/output line 442 of the ESD elements 402, 404.

Figure 5:
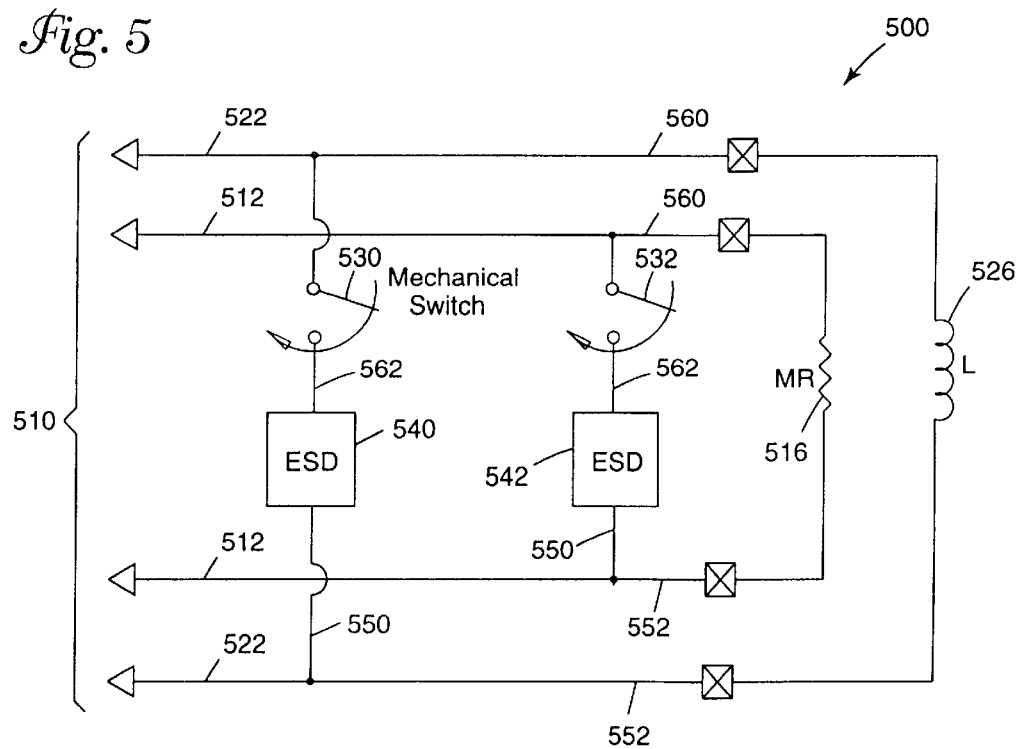
FIG. 5 is an electrical schematic of the ESD protection system according to the present invention as described with reference to FIGS. 3–4 above.

FIG. 5 is an electrical schematic 500 of the ESD protection system according to the present invention as described with reference to FIGS. 3–4 above. In FIG. 5, a four lead 510 MR/inductive head is shown. A first pair of leads 512 extend to the armature electronics (AE) (not shown) from the MR head 516. Again, those skilled in the art will recognize that the present invention is not meant to be limited to a particular type of head, but that the MR head 516 may be any type of head including an anisotropic MR head or a giant MR head. In addition to the first pair of leads 512, a second pair of leads 522 extend from the inductive head 526 to the armature electronics. The shorting bar, or conductive member, described with reference to FIGS. 3–4 is shown in FIG. 5 as a switches 530, 532. The ESD elements 540, 542 are shown with first input/output lines 550 connected to first wires 552 from the MR 516 and inductive 526 head. The mechanical shorting bar shorts together the second wires 560 from the MR 516 and inductive 526 head to the second input/output lines 562 of the ESD elements 540, 542. The ESD elements 540, 542 can be controlled in an "on" or "off" state for testing, evaluation or diagnostics of the armature or MR head. Furthermore, the mechanical switch 530, 532 can unload the ESD network 540, 542 to avoid capacitance and functional loading on the MR head 516 so that GMR and AMR functional performance is not degraded. The shorting bar 530, 532 is electrically isolated so the leads 510 of the MR 516 and inductive 526 heads are not shorted together or the leads 510 of the MR 516 and inductive 526 heads are not shorted to the suspension.

Figure 6:
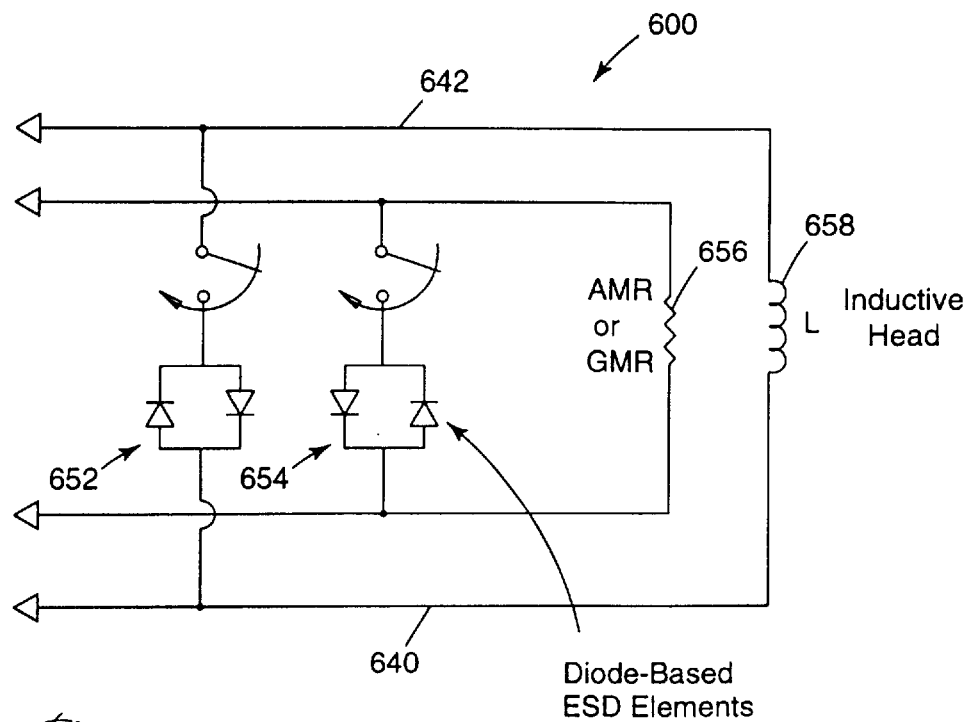
FIG. 6 illustrates the ESD protection system according to the present invention wherein the ESD elements are diodes.

FIG. 6 illustrates the ESD protection system 600 according to the present invention wherein the ESD elements are diodes. Diodes pairs 652, 654 may be coupled in parallel to the MR 656 and inductive 658 element. The diodes pairs 652, 654 provide a low conduction path for the fast discharging of electrostatic charge buildup. The diodes pairs 652, 654 provide the electrical separation necessary to provide proper local isolation between the first 640 and last 642 turn of inductive element 658 and between the leads of the MR 656 element so that normal operation of the head is maintained. The diodes in the diode pairs 652, 654 are arranged in a back-to-back, parallel fashion to accommodate both positive and negative potentials across the MR 656 and inductive 658 element. When electrostatic discharge occurs across the MR 656 and inductive 658 element, the charge is dissipated across the diodes 652, 654 when the potential of the electrostatic charge rises above (in an absolute sense) the threshold voltage (typically 0.7 volts) on either of the back-to-back diodes.

Figure 7:
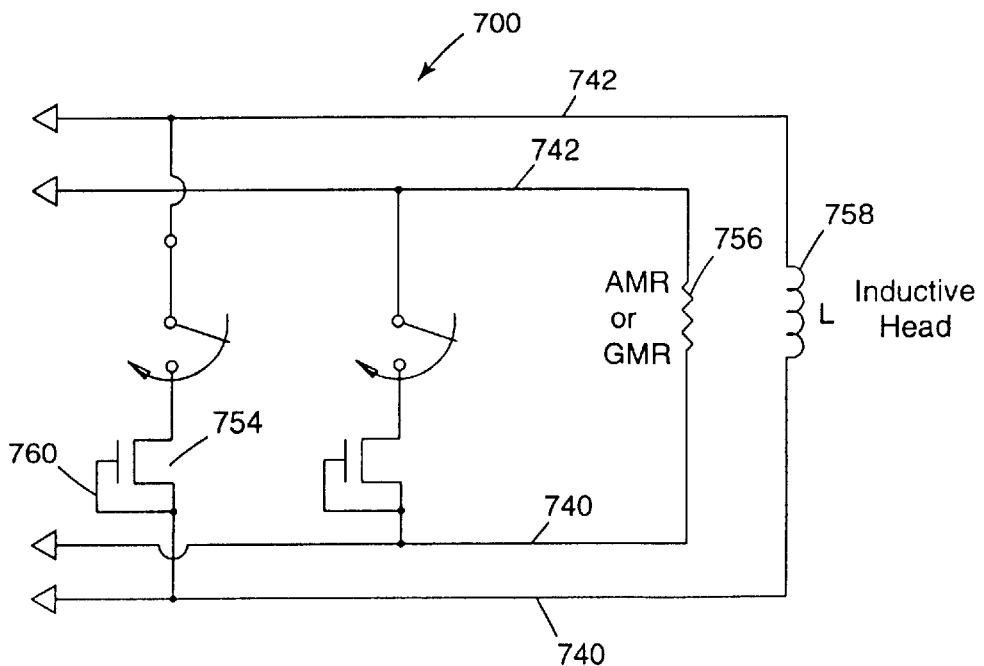
FIG. 7 illustrates the ESD protection system according to the present invention wherein the ESD elements are transistors.

FIG. 7 illustrates the ESD protection system 700 wherein the ESD elements are transistors. In FIG. 7, an N-type MOSFET 754 is disposed between the first 740 and last 742 lead of the MR 756 and inductive 758 element. The gate 760 of the MOSFET 754 is tied to the first lead 740 of the MR 756 and inductive 758 element.

Figure 8:
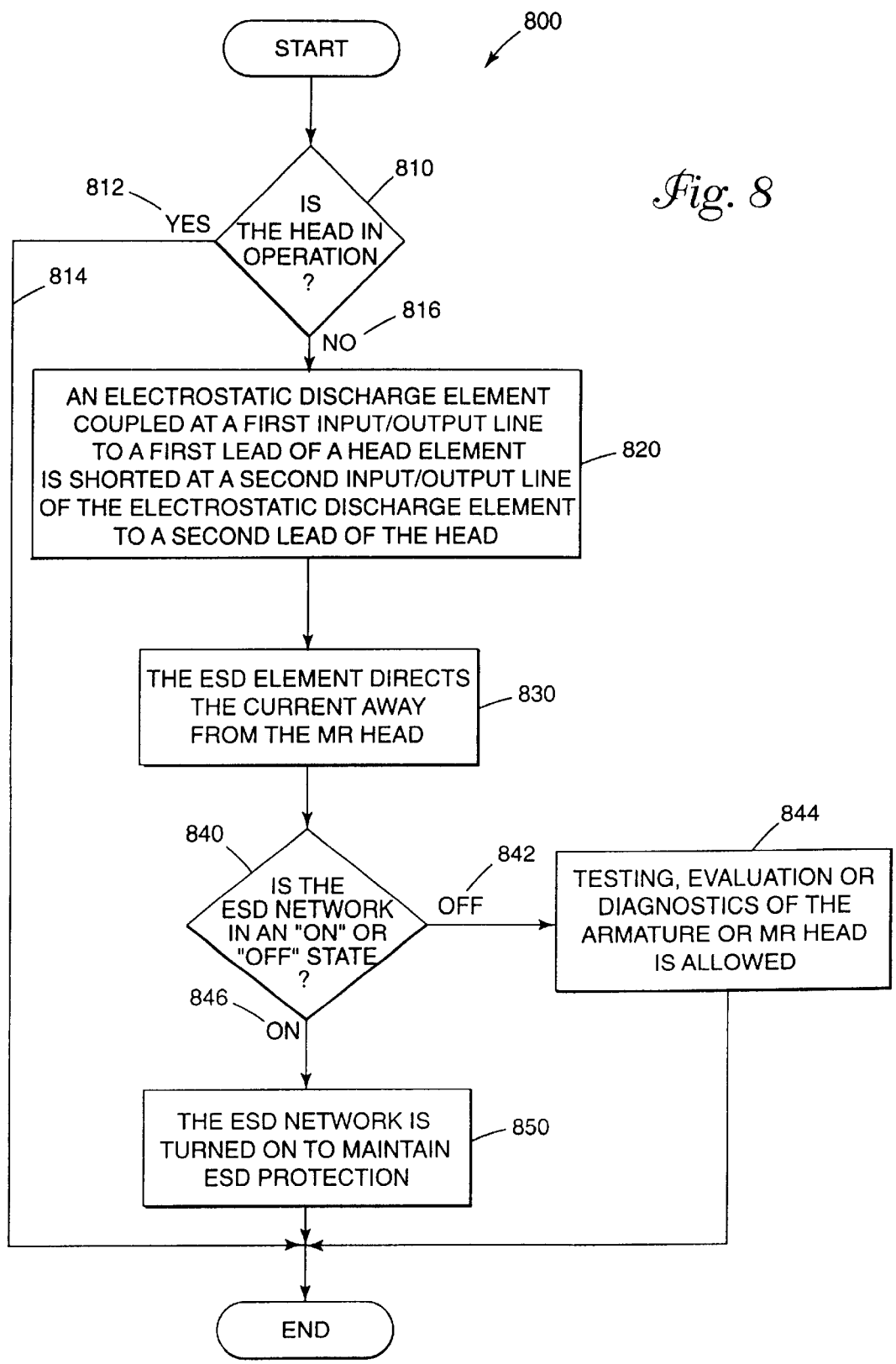
FIG. 8 illustrates a method for providing electrostatic discharge protection of a magnetic head using a mechanical switch and an electrostatic discharge device network according to the present invention.

FIG. 8 illustrates a method 800 for providing electrostatic discharge protection of a magnetic head using a mechanical switch and an electrostatic discharge device network according to the present invention. First, is the head in operation 810, i.e., is the MR head supported. If yes 812, the shorting and engagement of the ESD element are not performed 814. If no 816, an electrostatic discharge element coupled at a first input/output line to a first lead of a head element engages a contact point at a second input/output line of the electrostatic discharge element and a contact point at a second lead of the head to short the two leads together 820. The ESD element is then positioned in parallel with the head element. The ESD element directs the current away from the MR head 830. The ESD network can be controlled in an "on" or "off" state 840. The ESD network may be turned off 842 to allow testing, evaluation or diagnostics of the armature or MR head 844. The ESD network may be turned on 846 to maintain ESD protection 850.

A magnetic head using a mechanical switch and an electrostatic discharge device network is disclosed. A mechanical switch is in series and parallel configuration with a silicon electrostatic discharge network. The electrostatic discharge network can be controlled in an on or off state for testing, evaluation or diagnostics of the armature or MR head. Accordingly, the mechanical switch provides ESD protection to the MR head while avoiding unwanted performance impact of the ESD network on head performance. The present invention allows for ESD testing without direct shorting across the MR head, whereas the prior systems shorts the leads together, which prevents testing and other means of diagnosis.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for protecting an MR head from electrostatic discharge, comprising:

a first lead from a head element;

a second lead from a head element having a contact point;

an electrostatic discharge element, coupled to the first lead from the head element via a first input/output line, the electrostatic discharge element having a second input/output line with a contact point; and a conductive member positioned proximate the contact point of the second lead and the contact point of the second input/output line, the conductive member engaging the contact point of the second lead and the contact point of the second input/output line in response to absence of a load being applied to the head, the engagement of the conductive member with the contact point of the second lead and the contact point of the second input/output line connecting the electrostatic discharge element to the first and second leads from the head element in parallel with the head element.

2. The apparatus of claim 1 wherein the conductive member disengages the contact point of the second lead and the contact point of the second input/output line in response to a load being applied to the head.

3. The apparatus of claim 1 wherein the electrostatic discharge element is turned on to maintain electrostatic discharge protection for the head.

4. The apparatus of claim 1 wherein the electrostatic discharge element is turned off to allow operation of the head.

5. The apparatus of claim 4 wherein the operation of the head includes testing, evaluation and diagnostics of the head.

6. The apparatus of claim 1 wherein the electrostatic discharge element comprises a pair of back-to-back, parallel diodes for accommodating both positive and negative potentials across the element.

7. The apparatus of claim 1 wherein the electrostatic discharge element comprises an N-type MOSFET transistor disposed between the first and second lead of the head element, a gate of the MOSFET transistor being tied to the first lead of the head element.

8. The apparatus of claim 1 wherein the head element comprises an MR element.

9. The apparatus of claim 1 wherein the head element comprises an inductive coil element.

10. A disk drive system, comprising:

a magnetic storage disk for storing data thereon;

a MR head located proximate to the disk for reading and writing data to and from the disk;

a disk movement device, coupled to the disk, for rotating the disk;

an actuator arm, coupled to the MR head, for supporting the MR head; and an actuator, coupled to the access arm, for moving actuator arm to position the MR head relative to the disk;

wherein the actuator arm further comprises:

a first lead from a head element;

a second lead from a head element having a contact point;

an electrostatic discharge element, coupled to the first lead from the head element via a first input/output line, the electrostatic discharge element having a second input/output line with a contact point; and a conductive member positioned proximate the contact point of the second lead and the contact point of the second input/output line, the conductive member engaging the contact point of the second lead and the contact point of the second input/output line in response to absence of a load being applied to the head, the engagement of the conductive member with the contact point of the second lead and the contact point of the second input/output line connecting the electrostatic discharge element to the first and second leads from the head element in parallel with the head element.

11. The disk drive system of claim 10 wherein the conductive member disengages the contact point of the second lead and the contact point of the second input/output line in response to a load being applied to the head.

12. The disk drive system of claim 10 wherein the electrostatic discharge element is turned on to maintain electrostatic discharge protection for the head.

13. The disk drive system of claim 10 wherein the electrostatic discharge element is turned off to allow operation of the head.

14. The disk drive system of claim 13 wherein the operation of the head includes testing, evaluation and diagnostics of the head.

15. The disk drive system of claim 10 wherein the electrostatic discharge element comprises a pair of back-to-back, parallel diodes for accommodating both positive and negative potentials across the element.

16. The disk drive system of claim 10 wherein the electrostatic discharge element comprises an N-type MOSFET transistor disposed between the first and second lead of the head element, a gate of the MOSFET transistor being tied to the first lead of the head element.

17. The disk drive system of claim 10 wherein the head element comprises an MR element.

18. The disk drive system of claim 10 wherein the head element comprises an inductive coil element.

* * * * *